(12) United States Patent
Kang

(10) Patent No.: US 8,031,587 B1
(45) Date of Patent: Oct. 4, 2011

(54) METHOD AND DEVICE OF SYNCHRONIZING SYMBOL TIMING, AND OFDM COMMUNICATION SYSTEM

(75) Inventor: Dong-Hyun Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 128 days.

(21) Appl. No.: 12/496,328

(22) Filed: Jul. 1, 2009

(51) Int. Cl.
*H04J 11/00* (2006.01)
*H04J 3/06* (2006.01)
*H04J 12/28* (2006.01)

(52) U.S. Cl. ........ 370/210; 370/350; 370/503; 370/252; 375/260; 375/227

(58) Field of Classification Search .............. 370/208, 370/503, 206, 210, 252, 350; 375/260, 149, 375/340, 342, 324, 327, 224, 227; 455/67.11, 455/115.1
See application file for complete search history.

(56) References Cited

U.S. PATENT DOCUMENTS

| | | | |
|---|---|---|---|
| 6,999,507 B2 * | 2/2006 | Jin | 375/224 |
| 7,596,154 B2 * | 9/2009 | Mehta | 370/504 |
| 2005/0238110 A1 * | 10/2005 | Yun et al. | 375/260 |
| 2006/0018413 A1 * | 1/2006 | Gupta | 375/343 |
| 2007/0217524 A1 | 9/2007 | Wang et al. | |
| 2008/0112475 A1 * | 5/2008 | Ma | 375/224 |
| 2008/0247476 A1 * | 10/2008 | Pirot | 375/260 |
| 2008/0291817 A1 * | 11/2008 | Gupta | 370/208 |
| 2009/0067519 A1 * | 3/2009 | Baggen et al. | 375/260 |
| 2009/0168908 A1 * | 7/2009 | Lee et al. | 375/260 |
| 2010/0040043 A1 * | 2/2010 | Li | 370/350 |
| 2010/0074348 A1 * | 3/2010 | Xu | 375/260 |
| 2010/0166088 A1 * | 7/2010 | Arambepola et al. | 375/260 |

FOREIGN PATENT DOCUMENTS

| | | |
|---|---|---|
| JP | 2002-084578 | 3/2002 |
| WO | 99/49587 | 9/1999 |

* cited by examiner

*Primary Examiner* — Kwang B Yao
*Assistant Examiner* — Candal Elpenord
(74) *Attorney, Agent, or Firm* — F. Chau & Associates, LLC

(57) ABSTRACT

To synchronize symbol timing in a communication system, time-domain signals are generated by performing an IFFT on frequency-domain signals. Positions of power peaks are detected by analyzing a channel impulse response (CIR) of the time-domain signals. Channel state informations are provided by analyzing a channel state, such that each channel state information corresponds to each position of the power peaks. A proper symbol start position is determined based on the channel state informations.

18 Claims, 16 Drawing Sheets

RX DATACONSTELLATION AFTER CIRA-[HP0],SNR=23.6dB CHANNEL=SFN(220μs)

RX DATACONSTELLATION AFTER CIRA-[HPO],SNR=23.6dB CHANNEL=SFN(220μs)

RX DATACONSTELLATION AFTER CIRA-[HP0],SNR=23.6dB CHANNEL=SFN(220μs)

RX DATACONSTELLATION AFTER CIRA-[HP0], SNR=23.6dB CHANNEL=SFN(220μs)

RX DATACONSTELLATION AFTER CIRA-[HPO],SNR=23.6dB CHANNEL=SFN(220μs)

METHOD AND DEVICE OF SYNCHRONIZING SYMBOL TIMING, AND OFDM COMMUNICATION SYSTEM

BACKGROUND

1. Technical Field

The present disclosure relates to wireless communication, and more particularly to a method and a device of synchronizing symbol timing, and OFDM communication system including the symbol timing synchronization device.

2. Discussion of the Related Art

In a communication system based on an Orthogonal Frequency Division Multiplexing (OFDM), channel delay profile estimation for a Single Frequency Network (SFN) is required. Guard Interval (GI) is inserted in a transmission signal to remove Inter-Symbol interference (ISI) due to channel delay in almost all OFDM systems, even though use of GI degrades transmission efficiency. For example, symbol timing synchronization in Video Broadcasting-Terrestrial/Handheld (DVB-T/H) systems may be classified into time-domain processing types using GI and Cyclic Prefix (CP) and frequency domain processing types using pilot symbols. Determination of exact symbol timing, that is, a symbol start position, is one of important factors for enhancing system performance.

SUMMARY

According to an exemplary embodiment a method of synchronizing symbol timing in a communication system is provided which efficiently determines a proper symbol start position in channel circumstances of multi-path delay.

According to an exemplary embodiment a symbol timing synchronization device in a communication system is provided which efficiently determines a proper symbol start position in channel circumstances of multi-path delay.

According to an exemplary embodiment a communication system is provided which includes the symbol timing synchronization device which efficiently determines a proper symbol start position in channel circumstances of multi-path delay.

According to an exemplary embodiment a method of synchronizing symbol timing in a communication system is provided. Time-domain signals are provided by performing an inverse fast fourier transform (IFFT) on frequency-domain signals. Positions of power peaks are detected by analyzing a channel impulse response (CIR) of the time-domain signals. Channel state informations are provided by analyzing a channel state, where each channel state information corresponds to each position of the power peaks. A symbol start position is determined based on the channel state informations.

Detecting the positions of the power peaks may include estimating the power peaks based on threshold values for rejecting noise peaks.

Detecting the positions of the power peaks may include abstracting a main peak power corresponding to a maximum power of the time-domain signals, scaling threshold values based on the main peak power, where the threshold values are for rejecting noise peaks, and estimating the power peaks based on the scaled threshold values.

Providing the channel state informations may include calculating timing offsets and path delays based on the positions of the power peaks, compensating a current symbol timing of the communication device based on the timing offsets and the path delays, respectively, and measuring the channel state informations based on the respectively compensated symbol timing.

Providing the channel state informations may include calculating variances of powers of sub-carriers, where each variance corresponds to each channel state information. The variances may include inter-carrier interference (ICI) noises and inter-symbol interference (ISI) noises.

Determining the symbol start position may include comparing the variances to determine the peak power corresponding to a minimum variance, and determining the symbol start position based on a timing offset of the power peak corresponding to the minimum variance.

Based on the positions of the power peaks, it may be determined whether multi-path interference exists and/or whether a delay time due to multi-path delay is out of a guard interval of a symbol.

According to an exemplary embodiment a symbol timing synchronization device in a communication system, includes an inverse fast fourier transform (IFFT) unit, a channel impulse response (CIR) analyzer, a channel state analyzer, and a control unit.

The IFFT unit is configured to convert frequency-domain signals into time-domain signals. The CIR analyzer is configured to detect positions of power peaks by analyzing a CIR of the time-domain signals. The channel state analyzer is configured to provide channel state informations by analyzing a channel state, where each channel state information corresponds to each position of the power peaks. The control unit is configured to control the IFFT unit, the CIR analyzer and the channel state analyzer, and configured to determine a symbol start position based on the channel state informations.

The symbol timing synchronization device may further include a storage unit configured to store values of the time-domain signals from the IFFT unit.

The CIR analyzer may include a peak power estimator configured to sequentially receive the time-domain signals to generate peak on signals based on powers of the time-domain signals, a peak position detector configured to generate peak position signals based on threshold values and the peak on signals, where the threshold values are for rejecting noise peaks, and an offset-delay estimator configured to calculate timing offsets and path delays based on the peak position signals.

The symbol timing synchronization device may further include an address generator configured to generate an address signal for identifying each of the sequentially received time-domain signals. The peak position detector may generate peak position signals based on the address signal when the peak on signals are activated.

The CIR analyzer may further include a main peak power abstractor configured to abstract a main peak power corresponding to a maximum power of the time-domain signals.

The peak power estimator may be configured to scale threshold values based on the main peak power, where the threshold values are for rejecting noise peaks, to generate the peak on signals based on the scaled threshold values.

The peak position detector may be configured to determine, based on the positions of the power peaks, whether multi-path interference exists and whether a delay time due to multi-path delay is out of a guard interval of a symbol.

The symbol timing synchronization device may further include a channel state comparator configured to compare the channel state informations to generate a comparison signal indicating the power peak that corresponds to a best channel state. The control unit may determine the symbol start position based on the comparison signal.

According to an exemplary embodiment a communication system based on an orthogonal frequency division multiplexing (OFDM) signal is provided. The communication system includes a reception unit, an inverse fast fourier transform (IFFT) unit, a channel impulse response (CIR) analyzer, a channel state analyzer, and a control unit.

The reception unit is configured to receive the OFDM signal and configured to generate frequency-domain signals by processing the received OFDM signal. The IFFT unit is configured to convert the frequency-domain signals into time-domain signals. The CIR analyzer is configured to detect positions of power peaks by analyzing a CIR of the time-domain signals. The channel state analyzer is configured to provide channel state informations by analyzing a channel state, where each channel state information corresponds to each position of the power peaks. The control unit is configured to control the IFFT unit, the CIR analyzer and the channel state analyzer, and configured to determine a symbol start position of the OFDM signal based on the channel state informations.

The reception unit may include a demodulator configured to demodulate the received OFDM signal to generate a demodulated signal and configured to provide coarse sampling timing by abstracting a correlation peak of the demodulated signal, a guard interval (GI) remover configured to remove the GI in the demodulated signal, and a fast fourier transform (FFT) unit configured to convert an output of the GI remover into the frequency-domain signals.

The GI remover is configured to change the coarse sampling timing based on the symbol start position that is determined by the control unit.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EXEMPLARY EMBODIMENTS

Various exemplary embodiments will be described more fully hereinafter with reference to the accompanying drawings. Exemplary embodiment of the present invention may take many different forms and should not be construed as limited to the exemplary embodiments set forth herein. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present invention. As used herein, the singular fouls "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
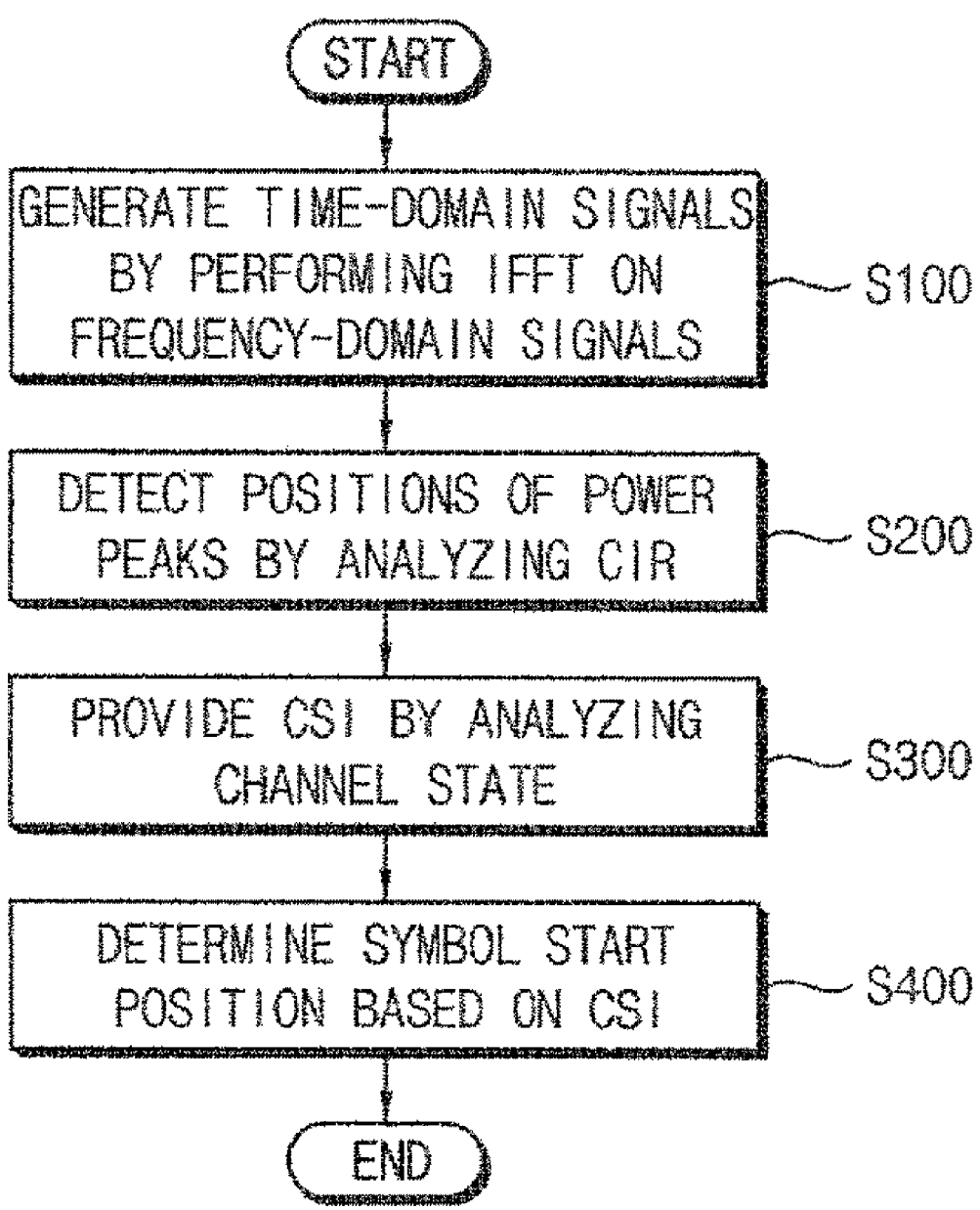
FIG. 1 is a flow chart illustrating a method of synchronizing symbol timing in a communication system according to an exemplary embodiment.

FIG. 1 is a flow chart illustrating a method of synchronizing symbol timing in a communication system according to an exemplary embodiment.

Referring to FIG. 1, in accordance with a method of synchronizing symbol timing in a communication system, time-domain signals are generated by performing an Inverse Fast Fourier Transform (IFFT) on frequency-domain signals (Step S100). Positions of power peaks are detected by analyzing a Channel Impulse Response (CIR) of the time-domain signals (Step S200). Channel State Informations (CSIs) are provided by analyzing a channel state, where each channel state information corresponds to each position of the power peaks (Step S300). Finally, a symbol start position is determined based on the channel state informations (Step S400).

In accordance with the method of synchronizing symbol timing, the symbol start position is sequentially compensated based on the analyzed CIR, that is, based on the result of IFFT, and CSIs corresponding to the respective symbol start positions are analyzed to find a proper symbol start position within an ISI-free interval.

Hereinafter, referring to FIGS. 2 through 7, a symbol timing synchronization device and a communication system according to exemplary embodiments will be described with respect to a two-path fading channel. In other words, for convenience of description, the present disclosure is centered on an exemplary case in which two power peaks are detected, but those skilled in the art will readily appreciate that many modifications are possible such that three or more power peaks may be detected with respect to an arbitrary multi-path delay channel.

Figure 2:
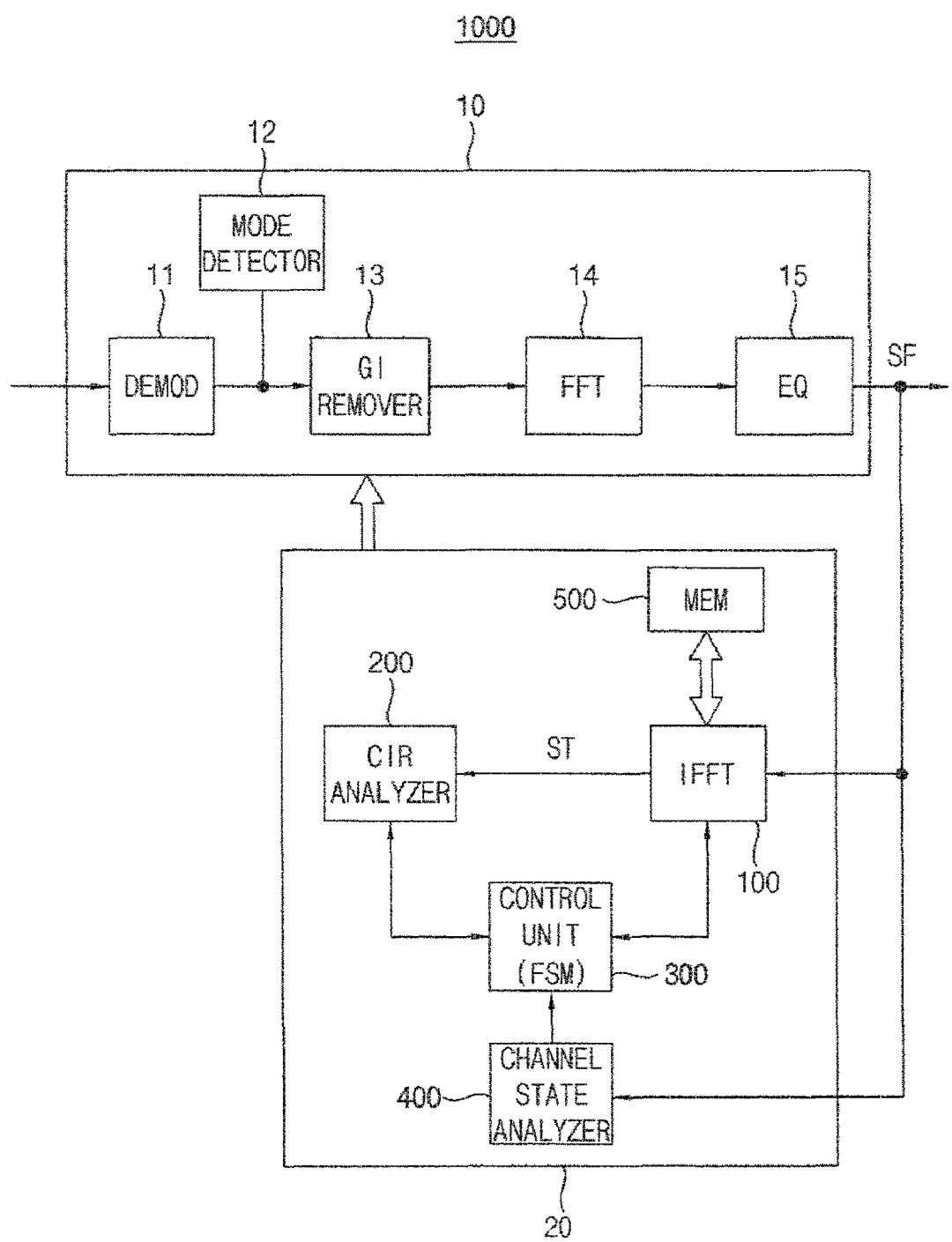
FIG. 2 is a block diagram illustrating a communication system including a symbol timing synchronization device according to an exemplary embodiment.

FIG. 2 is a block diagram illustrating a communication system including a symbol timing synchronization device according to an exemplary embodiment.

Referring to FIG. 2, a communication system 1000 includes a reception unit 10 and a symbol timing synchronization unit 20. The communication system 1000 may be an arbitrary communication system based on an Orthogonal Frequency Division Multiplexing (OFDM) signal, such as a Digital Multimedia Broadcasting (DMB) system, Digital Video Broadcasting-Terrestrial/Handheld (DVB-T/H) system, etc.

The reception unit 10 receives the OFDM signal and generates frequency-domain signals SF by processing the received OFDM signal. The reception unit 10 may include a demodulator 11, a mode detector 12, a Guard Interval (GI) remover 13, a Fast Fourier Transform (FFT) unit 14, and an equalizer 15.

The demodulator 11 demodulates the received OFDM signal to generate a demodulated signal and provides coarse sampling timing by abstracting a correlation peak based on the demodulated signal. For example, the demodulator 11 may include a correlator performing the coarse sampling timing. The correlator may be a Guard Interval-Cyclic Prefix (GI-CP) correlator that performs time-domain processing using GI and CP. The mode detector 12 determines a transmission mode of the received OFDM signal based on the demodulated signal. The GI remover 13 removes GI in the demodulated signal based on the coarse sampling timing provided by the demodulator 11. The FFT unit 14 converts the output of the GI remover 13 into the time-domain signals SF. The configuration of the reception unit 10 may be variously changed according to those skilled in the art, excepting subject matters associated with the symbol timing synchronization device 20. With respect to the symbol timing synchronization device 20, the reception unit 10 adjusts the coarse sampling timing according to the symbol start position determined by a control unit in the symbol timing synchronization device 20.

The symbol timing synchronization device 20 may include an inverse fast fourier transform (IFFT) unit 100, a channel impulse response (CIR) analyzer 200, a control unit 300 and a channel state analyzer 400. In an embodiment, the symbol timing synchronization device 20 may further include a storage unit that stores values of the time-domain signals ST from the IFFT unit 100.

The IFFT unit 100 converts the frequency-domain signals SF into the time-domain signals ST. The CIR analyzer 200 detects positions of power peaks by analyzing a CIR of the time-domain signals ST.

The channel state analyzer 400 provides Channel State Informations (CSIs) by analyzing a channel state, where each CSI corresponds to each position of the power peaks. To determine that the IFFT output reflects what kind of a channel state, noise power comparison may be adopted. For example, the CSI provided by the channel state analyzer 400 may be a Signal-to-Interference Ratio (SIR). Delay of the synchronization time due to the SIR comparison may be different according to types and characteristics of the equalizer 15, and the control unit 300 may be implemented so that the synchronization time delay may be controlled according to channel characteristic.

The control unit 300 controls operations of the IFFT unit 100, the CIR analyzer 200 and the channel state analyzer 400, compares the CSIs to find a case of smaller noise variance, and finally determines a symbol start position of the OFDM signal based on the comparison results.

In an embodiment, the control unit 300 may be implemented with a Finite State Machine (FSM) including a plurality of registers. Stored values in the registers may be changed depending on sequential operation results of the symbol timing synchronization device 20, and at least portion of the stored values in the registers may be provided as the control signal CTRL.

The symbol timing error in the OFDM system may start from a wrong symbol start position. In the conventional method of determining the symbol start position, typically the correlation peak of GI-CP interval may be used. Such conventional method may not cause serious problems in an Additive White Gaussian Noise (AWGN) channel or in a Single Frequency Network (SFN) channel when a pre-echo signal has higher power than a post-echo signal. Such conventional method, however, may cause Inter-Symbol Interference (ISI) when the pre-echo signal and the post-echo signal have substantially the same power, or when the pre-echo signal has lower power than the post-echo signal.

A method of synchronizing symbol timing according to an exemplary embodiment determines a proper symbol start position through CIR information feedback and SIR comparison and thus may prevent the symbol timing error according to such conventional method that uses simply a correlation peak for coarse symbol timing.

Figure 3:
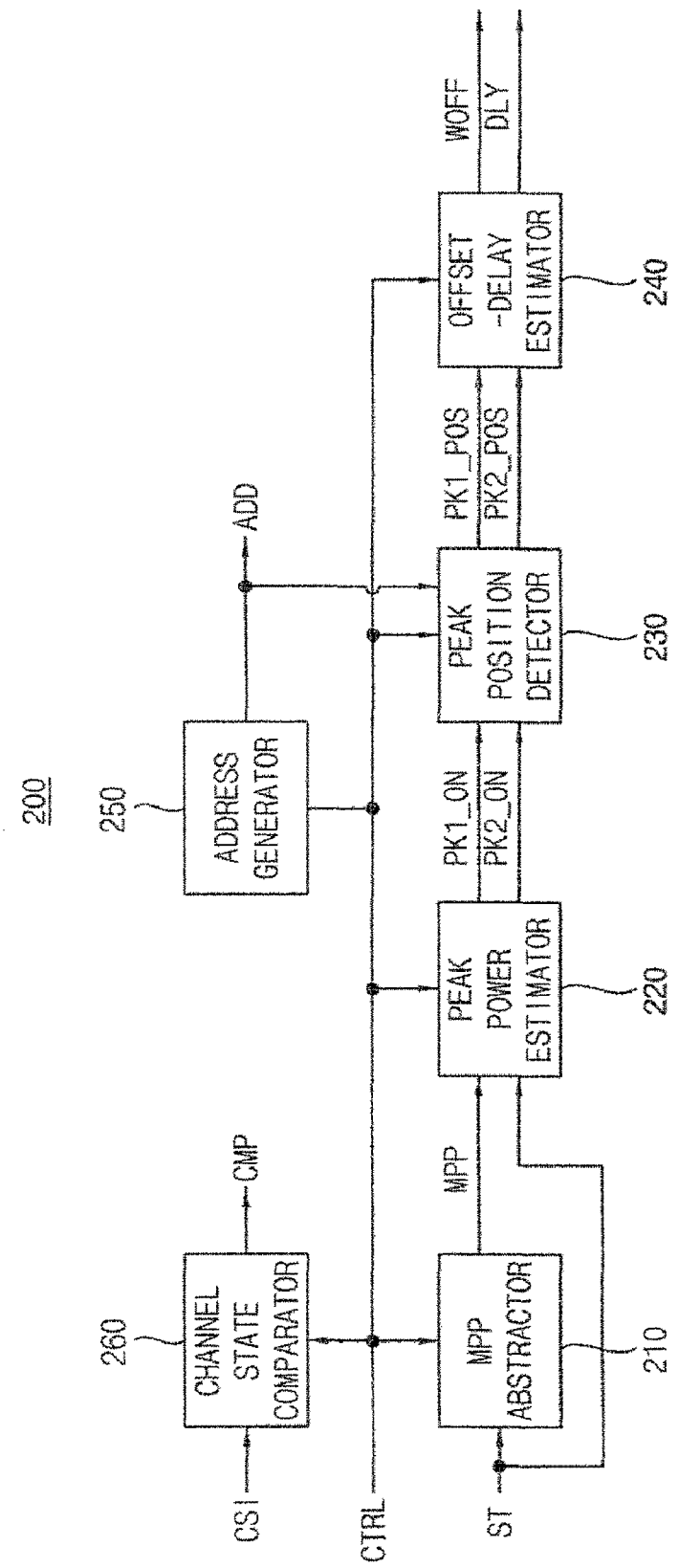
FIG. 3 is a block diagram illustrating a Channel Impulse Response (CIR) analyzer included in the symbol timing synchronization device of FIG. 2.

FIG. 3 is a block diagram illustrating a CIR analyzer included in the symbol timing synchronization device of FIG. 2.

Referring to FIG. 3, a CIR analyzer 200 may include a peak power estimator 220, peak position detector 230 and an offset-delay estimator 240.

The peak power estimator sequentially receives the time-domain signals ST to generate peak on signals PK1_ON and PK2_ON based on powers of the time-domain signals ST. The peak position detector 230 generates peak position signals PK1_POS and PK2_POS based on threshold values and the peak on signals PK1_ON and PK2_ON. The threshold values are used for rejecting noise peaks. The offset-delay estimator 230 calculates timing offsets WOFF and path delays DLY based on the peak position signals PK1_POS and PK2_POS.

The symbol timing synchronization unit 20 may further include a main peak abstractor 210, an address generator 250 and a channel state comparator 260, which may not be placed in the CIR analyzer 200 as illustrated in FIG. 3 and may be disposed in other appropriate places in the symbol timing synchronization unit 20.

The address generator 250 generates an address signal ADD for identifying each of the sequentially received time-domain signals ST. In an embodiment, the peak position detector 230 may generate peak position signals PK1_POS and PK2_POS based on the address signal ADD when the peak on signals PK1_POS and PK2_POS are activated.

The main power abstractor 210 abstracts a main peak power MPP corresponding to a maximum power of the time-domain signals ST. In an embodiment, the peak power estimator 220 may scale threshold values based on the main peak power MPP, where the threshold values are for rejecting noise peaks, to generate the peak on signals PK1_ON and PK2_ON based on the scaled threshold values.

The channel state comparator 260 compares the CSIs to generate a comparison signal CMP indicating the power peak that corresponds to a best channel state. In an embodiment, the control unit 300 may determine the symbol start position based on the comparison signal CMP.

The CIR may be obtained by analyzing IFFT results provided by performing IFFT on pilot symbols. For example, the scattered pilot abstracted from four consecutive symbols has three carrier distance, that is, $\Delta f'=3\Delta f$, where $\Delta f'$ is a frequency distance between pilots in a symbol and $\Delta f$ is a carrier spacing. According to sampling theorem that T'max=1/$\Delta f'$, T'max=1/(3$\Delta f$)=⅓(Tmax), that is, the maximum time-domain interval that can be analyzed after IFFT corresponds to a third of the entire interval. In case of N=8K mode, a maximum analyzable interval is 298.67 µs. Currently, NORDIC or MBRAI test specification suggests a maximum delay in a multi-path to be 260 µs even in case of outside GI, and thus the maximum analyzable interval satisfies such specifications. In this case, the IFFT size of N/4 may be sufficient.

Even though there is no limitation to the time-domain interval, the CRI analysis may have some ambiguities since the IFFT output (i) does not show the full length of the time-domain, (ii) has a period of ⅓ interval, and (iii) shows circular operation. Such ambiguities may induce critical errors in the FFT output, when the FFT start position, that is, coarse timing synchronization based on the GI-CP correlation peak is wrong. Accordingly determination for the respective channel states is required, but so many various cases of the channel states may be possible. In embodiments as will be described with reference to FIGS. 9 through 16, the cases of the channel states may be categorized into three cases.

Figure 4:
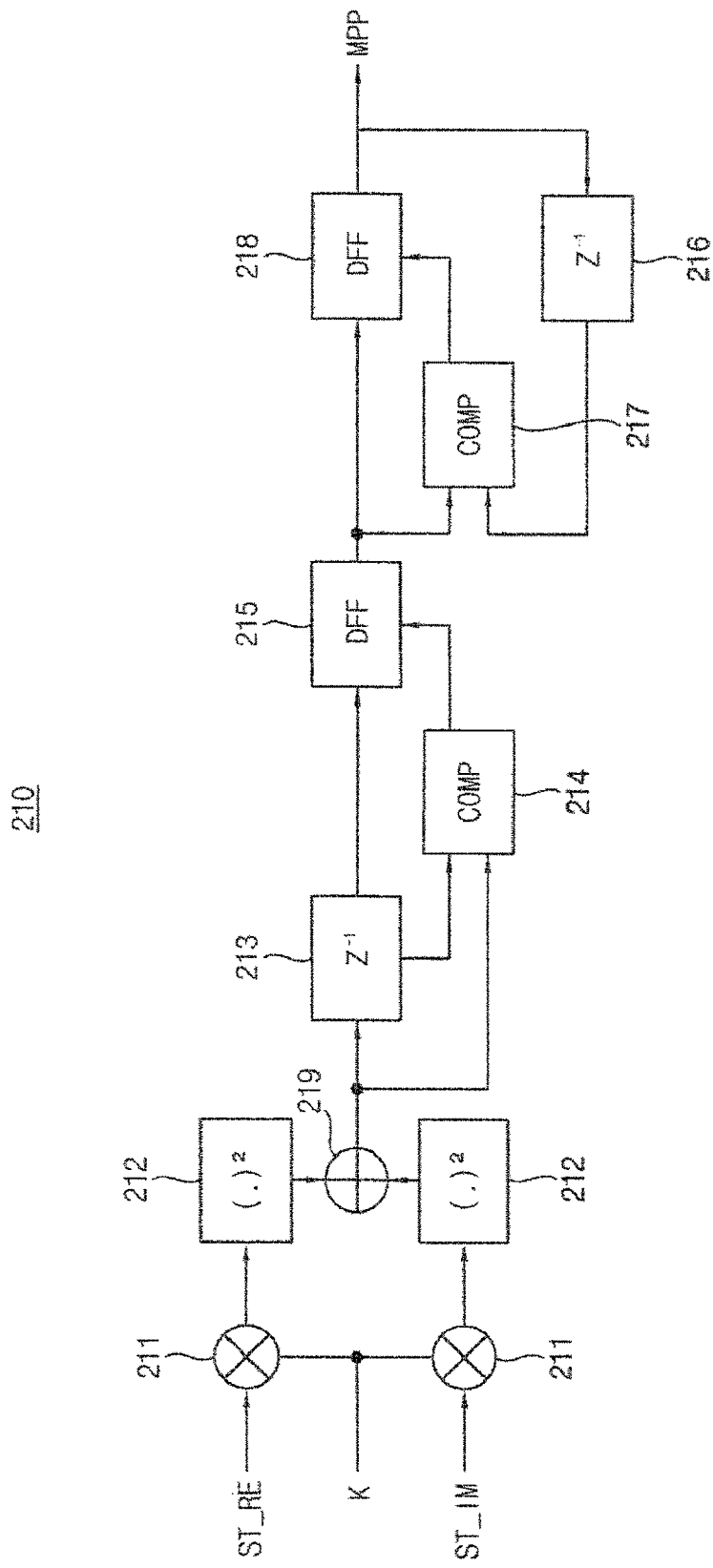
FIG. 4 is a circuit diagram illustrating a Main Peak Power (MPP) abstractor included in the CIR analyzer of FIG. 3.

FIG. 4 is a circuit diagram illustrating a Main Peak Power (MPP) abstractor included in the CIR analyzer of FIG. 3.

Referring to FIG. 4, the main peak power abstractor 210 may include multiplication calculators 211, square calculators 212, an adder 219, delay units 213 and 216, comparators 214 and 217, and flip-flops 215 and 218.

The multiplication calculators 211 normalize the time-domain signals ST by multiplying the component ST_RE and the imaginary component ST_IM respectively by K, where K is a normalization factor of the IFFT output. The square calculators 212 perform square calculation on the normalized components and the adder 219 sums the outputs of the square calculators 212. The adder 219 sequentially outputs powers of the respective time-domain signals ST. The comparator 214 compares the current power from the adder 219 with the previous power from the delay unit 213, and the value stored in the flip-flop 215 is updated when the current power is greater than the previous power. The comparator 217 compares the current MPP from the delay unit 216 with the output of the flip-flop 215, and the MPP stored in the flip-flop 218 is updated when the output of the flip-flop 215 is greater than the current MPP.

The squared magnitude sums from the adder 219 indicate CIR powers. Such CIR powers may include undesired peaks due to phase offset, timing offset, ICI, ISI, AWGN, etc. To obtain reliable peaks in CIR analysis by removing undesired peaks, the threshold-based peak rejection may be adopted. However, it is difficult to determine threshold values because CIR peak powers are severely influenced by the channel state. In an embodiment, the threshold values may be changed depending on the varying rate of the peaks, that is, the MPP provided by the main peak power abstractor 210 may be used as an index for scaling the threshold values.

Figure 5:
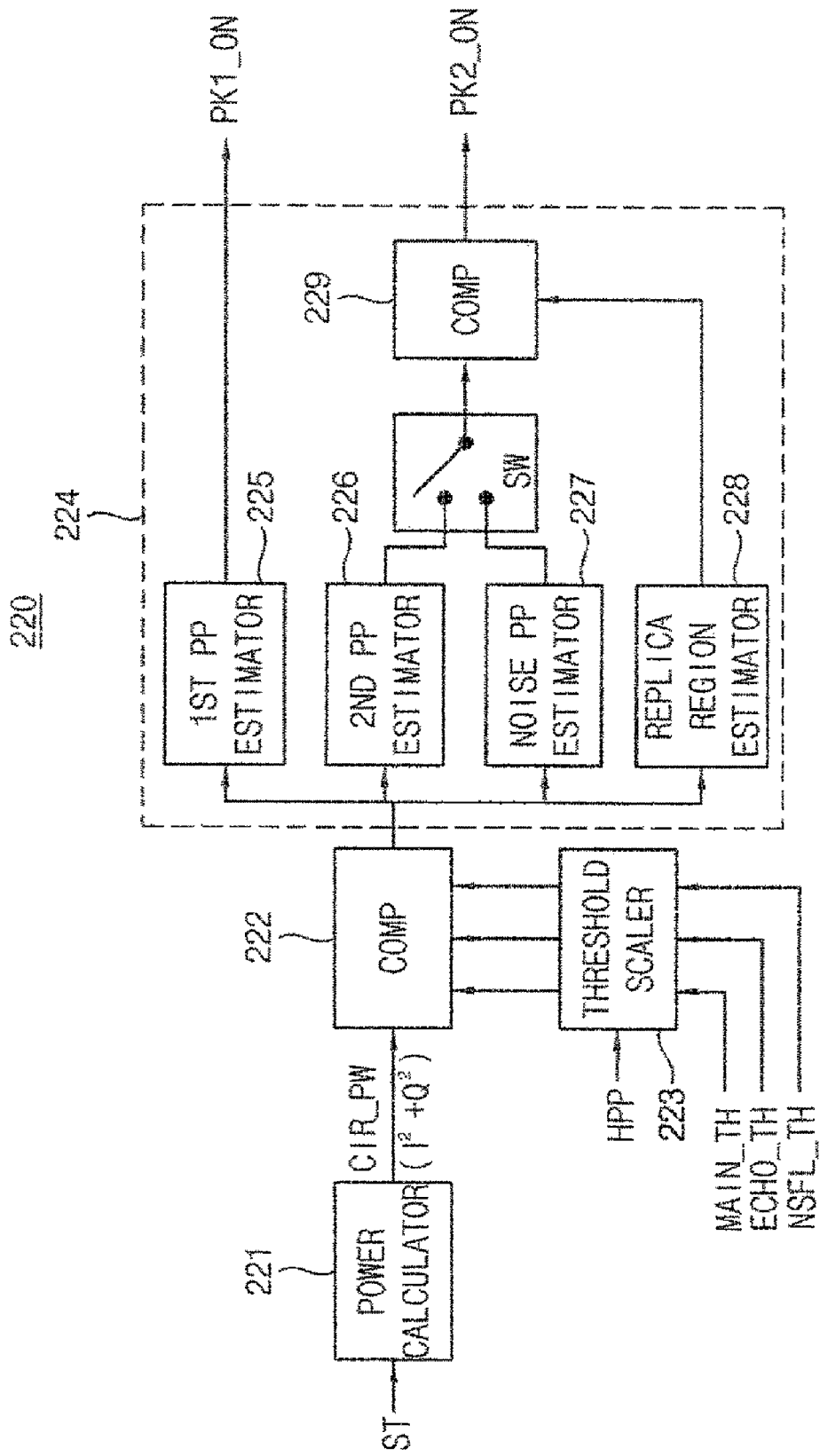
FIG. 5 is a block diagram illustrating a peak power estimator included in the CIR analyzer of FIG. 3.

FIG. 5 is a block diagram illustrating a peak power estimator included in the CIR analyzer of FIG. 3.

Referring to FIG. 5, a peak power estimator 220 may include a power calculator 221, a comparator 222, a threshold sealer 223, and an output unit 224.

The power calculator 221 sequentially outputs respective power CIR_PW of the sequentially inputted time-domain signals ST. As described with reference to FIG. 4, the power calculator 221 may be implemented with the multiplication calculators 211, the square calculators 212 and the adder 219. The threshold scaler 223 adjusts predetermined threshold values using the MPP. The predetermined threshold values may include a main signal threshold value MAIN_TH, an echo signal threshold value ECHO_TH, and a noise floor threshold value NSFL_TH. The comparator 222 compares the sequentially inputted power CIR_PW with the scaled threshold values and outputs the comparison result.

The output unit 224 generates a first peak on signal PK1_ON and a second peak on signal PK2_ON in response to the output of the comparator 222. The output unit 224 may include a first unit 225 for detecting a first peak, a second unit 226 for detecting a second peak, a noise estimator 227, a replica region estimator 228, a switch SW, and a comparator 229. The replica region estimator 228 calculates periodically repeated timing points and powers to detect replica noise regions, and controls the switch SW and the comparator 229 to remove repeated noise peaks.

The first peak on signal PK1_ON and the second peak on signal PK2_ON indicate respectively the positions of the first echo signal and the second echo signal with respect to the symbol start position that is determined through coarse symbol timing synchronization by the correlator in the reception unit 10.

Figure 6:
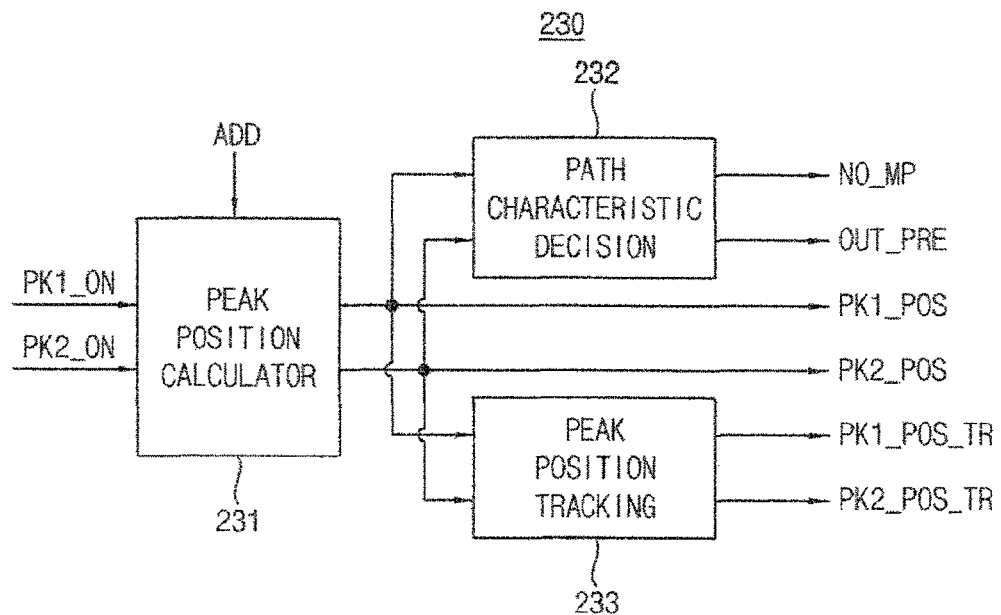
FIG. 6 is a block diagram illustrating a peak position detector included in the CIR analyzer of FIG. 3.

FIG. 6 is a block diagram illustrating a peak position detector included in the CIR analyzer of FIG. 3.

Referring to FIG. 6, a peak power detector 230 includes a peak position calculator 231. The peak on signals PK1_ON and PK2_ON outputted from the power peak estimator 220 during one IFFT cycle indicate the positions of the respective power peaks associated with one OFDM symbol. It is critical to find the exact positions of the power peaks, and the peak position calculator 231 performs such operation. In an embodiment, the peak position calculator 231 generates peak position signals PK1_POS and PK2_POS based on the address signal ADD from the address generator 250 when the peak on signals PK1_ON and PK2_ON are activated. Since the address of the storage unit 500, which stores the values of the time-domain signals ST from the IFFT unit 100, indicates sample position index, the peak position calculator 231 may determine the sampling positions of the power peaks using the addresses corresponding to the power peaks.

The peak power detector 230 may further include a path characteristic decision unit 232 and a peak position tracking unit 233.

The path characteristic decision unit 232 generates a path state signal NO_MP and a delay state signal OUT_PRE based on the peak position signals PK1_POS and PK2_POS. The path state signal NO_MP indicates whether multi-path interference exists and the delay state signal OUT_PRE indicates whether a delay time due to multi-path delay is out of a guard interval of a symbol. For example, the path state signal NO_MP may be activated when the positions of the first power peak and the second power peak are identical to each other. In this case, the correlator in the reception unit 10 does not miss the power peak, and thus peak position ambiguity may not occur. In estimating a channel state, a frequency domain interpolation filter in the reception unit 10 has to be adjusted according to an outside GI pre-echo case or an outside GI post-echo case. When the filter size is fixed, a filter edge has to be adjusted with respect to a main signal having 0 dB echo power. The adjustment of the frequency domain interpolation filter is required because of limitation to cutoff frequency according to the position of a main signal having 0 dB echo power, and thus it needs to determine whether the delay time due to multi-path delay is out of the guard interval of the OFDM symbol.

The peak position tracking unit 233 is enabled during a tracking mode, and generates tracking peak position signals PK1_POS_TR and PK2_POS_TR by measuring the peak positions per tracking cycle.

Figure 7:
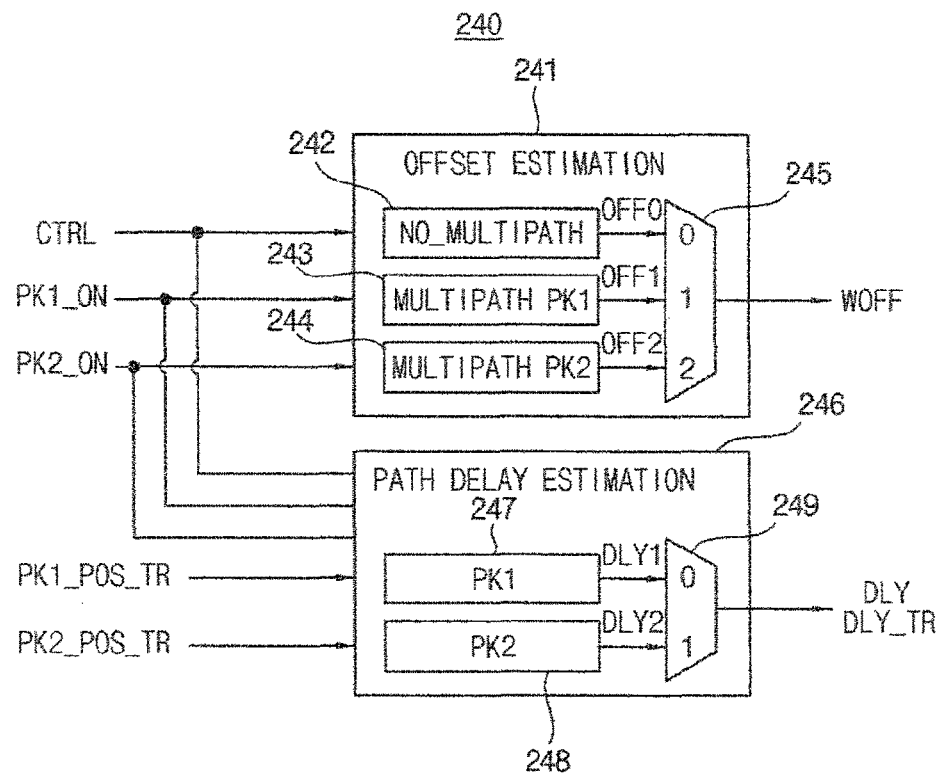
FIG. 7 is a block diagram illustrating an offset-delay estimator included in the CIR analyzer of FIG. 3.

FIG. 7 is a block diagram illustrating an offset-delay estimator included in the CIR analyzer of FIG. 3.

Referring to FIG. 7, an offset-delay estimator includes an offset estimation unit 241 and a path delay estimation unit 246.

The offset estimation unit 241 may include first through third units 242, 243 and 244 for calculating respective timing offsets and a multiplexer 245. The control signal CTRL from the control unit 300 may include the path state signal NO_MP indicating whether multi-path interference exists. When the path state signal NO_MP is activated, the multiplexer 245 selects and outputs the timing offset OFF0 of the first unit 242 as a timing offset WOFF. Also the control signal CTRL may include an assumption signal indicating a case of assuming that the coarse symbol timing performed by the reception unit 10 is wrong, or a case of assuming that the coarse symbol timing performed by the reception unit 10 is right. For example, when the assumption signal is in a first logic level, a first timing offset OFF1 calculated in the second unit 243 based on the first peak position signal PK1_POS may be selected and outputted as the timing offset WOFF, and when the assumption signal is in second logic level, a second timing offset OFF2 calculated in the third unit 244 based on the second peak position signal PK2_POS may be selected and outputted as the timing offset WOFF.

The path delay estimation unit 246 may include fourth and fifth units 247 and 248 and a multiplexer 249. The path delay estimation unit 246 may select and output a first path delay DLY1 calculated in the fourth unit 247 when the assumption signal is in the first logic level, and may select and output a second path delay DLY2 calculated in the fifth unit 248 when the assumption signal is in the second logic level. The path delay estimation unit 246 may output tracking path delays DLY_TR based on the tracking peak position signals PK1_POS_TR and PK2_POS_TR during the tracking mode.

The first timing offset OFF1 and the first path delay DLY1 are calculated with reference to the first peak position signal PK1_POS based on a first assumption or Hypothesis 1 that the coarse symbol timing performed by the reception unit 10 is wrong, and the second timing offset OFF2 and the second path delay DLY2 are calculated with reference to the second peak position signal PK2_POS based on a second assumption or Hypothesis 2 that the coarse symbol timing performed by the reception unit 10 is right. Two pairs of the timing offset and the path delay are respectively transferred to the reception unit 10 through the control unit 10, and the reception unit 10 compensates the sampling timing based on the timing offset and the path delay and generates the frequency domain signals SF respectively corresponding to each assumption. The channel state analyzer 400 provides a first channel state information CSI1 and a second channel state information CSI2 based on the respectively compensated frequency-domain signals SF.

The current channel profile cannot be determined only with CIR analysis based on the output of the IFFT unit 100, but relatively precise timing offset and the path delay may be calculated through the CIR analysis based on the assumption of the current channel profile. As will be described later in detail, the timing offsets and the path delays may be calculated with respect to a 'Wrong Timing' case (Hypothesis 1) and 'Right Timing' case (Hypothesis 2), based on the same CIR analysis. As such, if the offsets and path delays of two cases are calculated after once performing IFFT, the operational amount and time from FFT to IFFT may be reduced.

For example, interference power comparison may be adopted to determine which is proper among the two pairs of the timing offset and the path delay.

The equalized signal may be represented as the sum of $z(l,k)$ including Inter-Carrier Interference (ICI) and Inter-Symbol Interference (ISI) as follows.

$$z(l,k)=a(l,k)H(l,k)+n(l,k)+n(l,k;\text{ICI})+n(l,k;\text{ISI})$$

In the above equation, l denotes a symbol index, k denotes a sub-carrier index, $a(l,k)$ denotes a signal component generated in a transmitter, $H(l,k)$ denotes a channel frequency response, $n(l,k)$ denotes a channel noise, $n(l,k;\text{ICI})$ denotes an ICI noise, and $n(l,k;\text{ISI})$ denotes an ISI noise.

After normalizing the $z(l,k)$, a noise power variance (V) or a Signal-to-Interference Ratio (SIR) may be obtained as follows.

$$1/\text{SIR}=V=E\{|n(l,k)|2+|n(l,k;\text{ICI})|2+|n(l,k;\text{ISI})|2\}$$

In the above equation, $E\{\ \}$ denotes an expectation function.

When ISI and/or ICI exist, the variance is increased with respect to a data symbol where such interferences are removed. ISI and ICI are related with carrier offset, channel state, path delay and multi-path signal power, etc., a particular threshold may become rather unstable. Accordingly, a proper CIR may be understood by comparing two SIRs that are obtained after respectively compensating the timing offset and the path delay corresponding to 'Right Timing' Case and 'Wrong Timing' Case as mentioned above, and thus ISI-free symbol timing synchronization can be performed based on the analyzed CIR.

Figure 8:
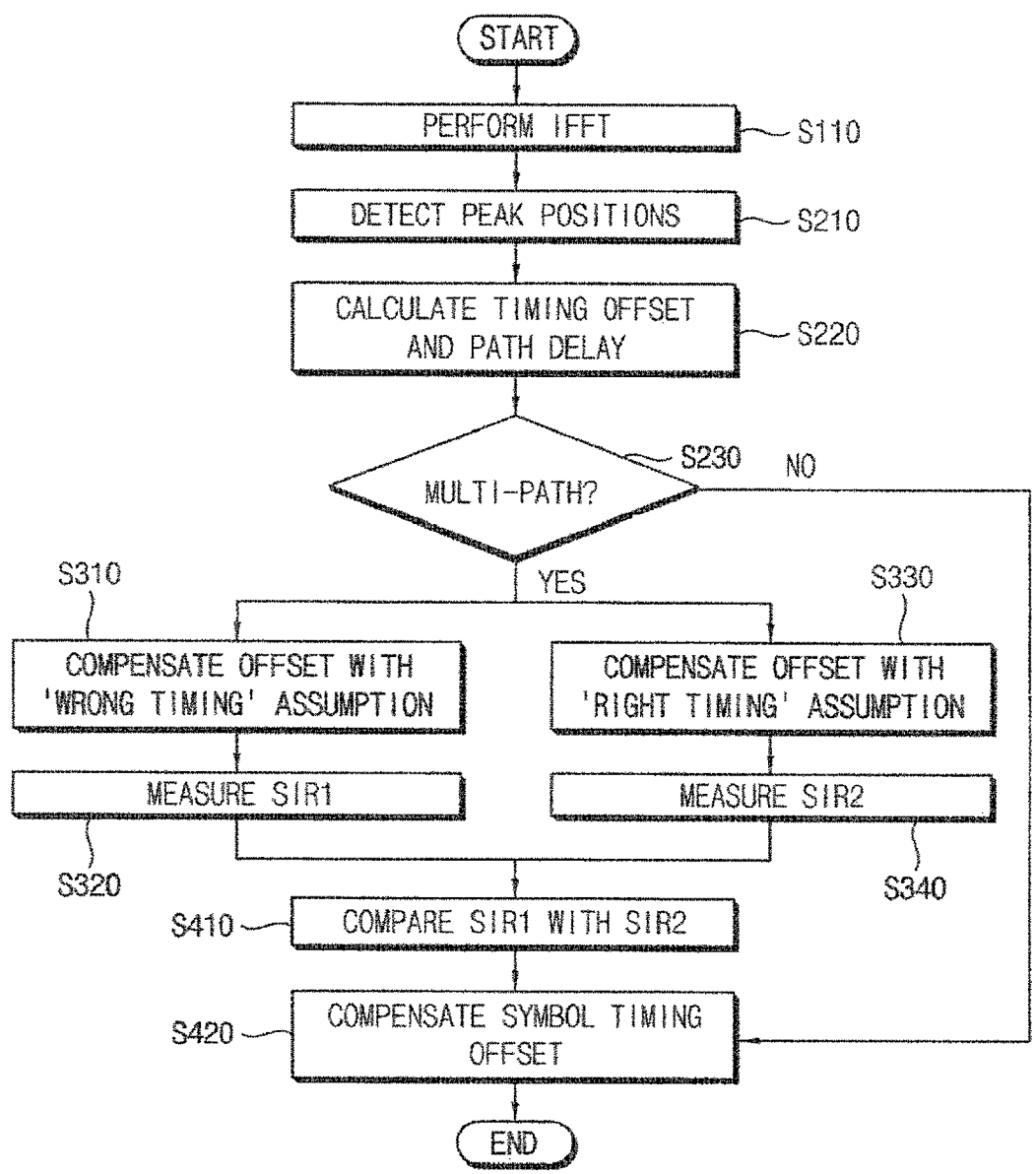
FIG. 8 is a flow chart illustrating a method of synchronizing symbol timing in an OFDM communication system according to an exemplary embodiment.

FIG. 8 is a flow chart illustrating a method of synchronizing symbol timing in an OFDM communication system according to an exemplary embodiment.

Referring to FIG. 8, the IFFT unit 100 converts the frequency-domain signals SF from the reception unit 10 into the time-domain signals ST by performing IFFT (Step S110). The CIR analyzer 200 analyzes CIR of the time-domain signals ST to detect positions of the power peaks (Step S210). The offset-delay estimator 240 of the CIR analyzer calculates the timing offsets and path delays based on the detected positions of the power peaks (Step S220). The path characteristic decision unit 232 of the CIR analyzer 200 determines whether the multi-path interference exists (Step S230). When the multi-path interference does not exist (Step S230: NO), the symbol timing of the reception unit 10 is compensated using the timing offset OFF0 (Step 420). When the multi-path interference exists (Step S230: YES), the channel state is analyzed and the channel state information SIR1 and SIR2 respectively corresponding to each position of the power peaks are measured (Steps S310, S320, S330 and S340). The first timing offset OFF1 and the first path delay DLY1, which are calculated based on the first assumption that the coarse symbol timing of the reception unit 10 is wrong, are transferred to the reception unit 10 to compensate the symbol timing (Step S310). The reception unit 10 generates the frequency-domain signal SF based on the compensated symbol timing, and the channel state analyzer 400 measures and provides the first channel state information SIR1 (Step S320). In parallel, the second timing offset OFF2 and the second path delay DLY2, which are calculated based on the second assumption that the coarse symbol timing of the reception unit 10 is right, are transferred to the reception unit 10 to compensate the symbol timing (Step S330). The reception unit 10 generates the frequency-domain signal SF based on the compensated symbol timing, and the channel state analyzer 400 measures and provides the second channel state information SIR2 (Step S330). The channel state comparator 260 compares the first channel state information SIR1 and the second channel state information SIR2 (Step S410) and provides the comparison signal CMP indicating the power peak that corresponds to a best channel state. The control unit 300 determines a final symbol start position based on the comparison signal CMP, and the reception unit 10 compensates the symbol timing offset based on the information provided by the control unit 300 (Step S420).

Hereinafter, operation and performance of the communication system including the symbol timing synchronization device according to exemplary embodiments will be further described with reference to FIGS. 9 through 16, which illustrates simulation results of the DVB system under the SFN circumstances having high delay spread fading characteristic. The SFN indicates a broadcasting system network such as DMB, DVB-T, DVB-H, etc., using the same frequency with respect to neighboring cells. In this case, the signals having high delay spread are received. With respect to FIGS. 9 through 16, the FFT mode is 8K mode, the modulation type is 64-QAM, and GI is 224 μs. Two-path fading channel is assumed, the channel delay is set to 220 μs, that is, 98% of GI for assuming the worst case of the multi-path channel, and Signal-to-Noise Ratio (SNR) is set to 23.5 dB.

Figure 9A:
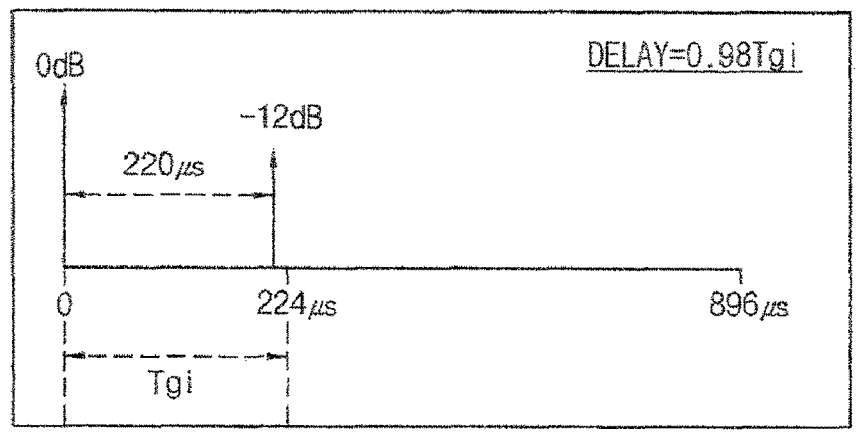
FIGS. 9A and 9B are diagrams illustrating a first channel profile case and a correlation peak thereof.
Figure 9B:
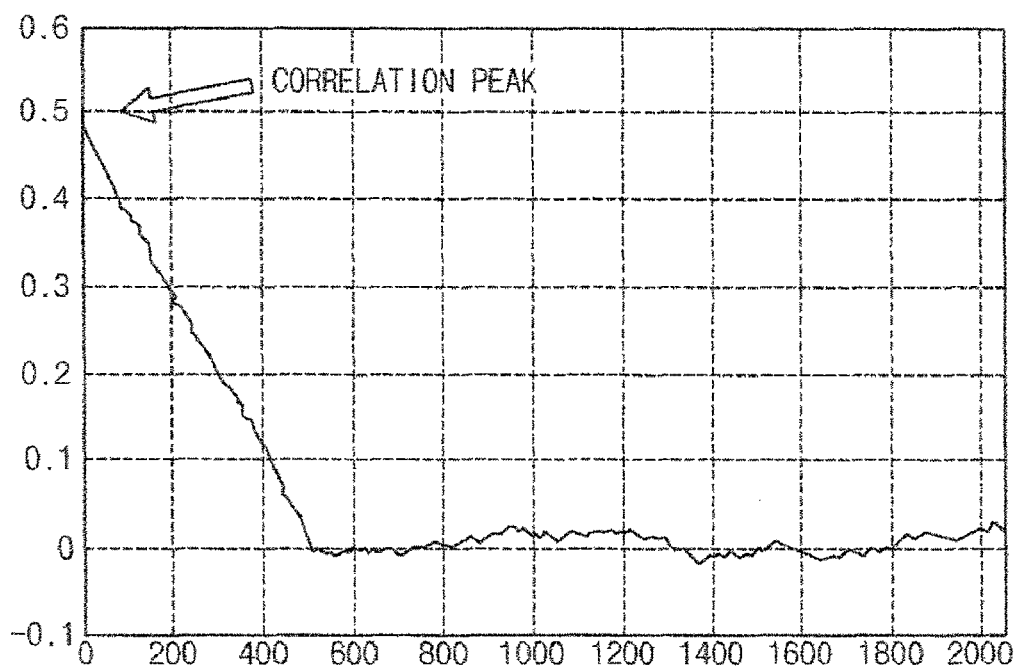

FIGS. 9A and 9B are diagrams illustrating a first channel profile case and a correlation peak thereof.

FIG. 9A illustrates a channel profile of Case I where the power of the post-echo signal is weaker by −12 dB than the power of the pre-echo signal, and FIG. 9B illustrates correlation result performed by the correlator in the reception unit 10 under the channel profile of Case I. The error of the correlation result may be reduced if correlation results are accumulated by repeating the correlation operation on the presumed GI-CP intervals for several OFDM symbols. In the channel profile of Case I, however, the power of the delayed signal is considerably weak as −12 dB, the correlation peak is formed near the 0 dB signal, and the reception unit 10 determines the coarse symbol start position based on the correlation peak.

Figure 10A:
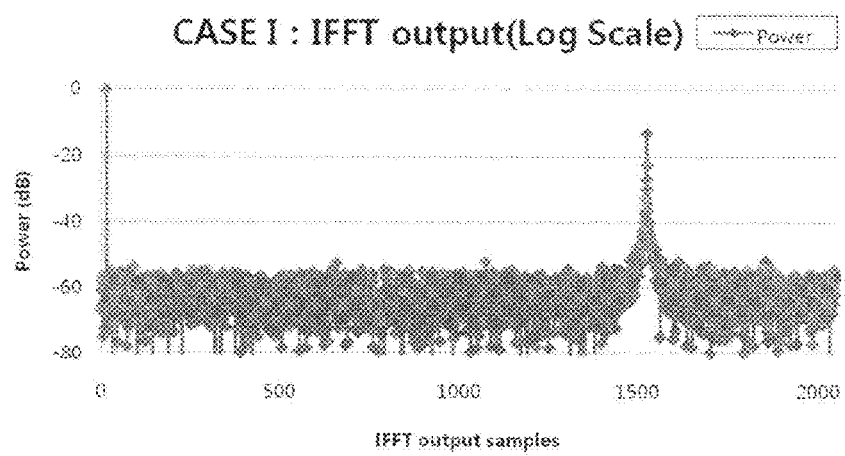
FIGS. 10A and 10B are diagrams illustrating an Inverse Fast Fourier Transform (IFFT) output and a constellation in the first channel profile case.
Figure 10B:
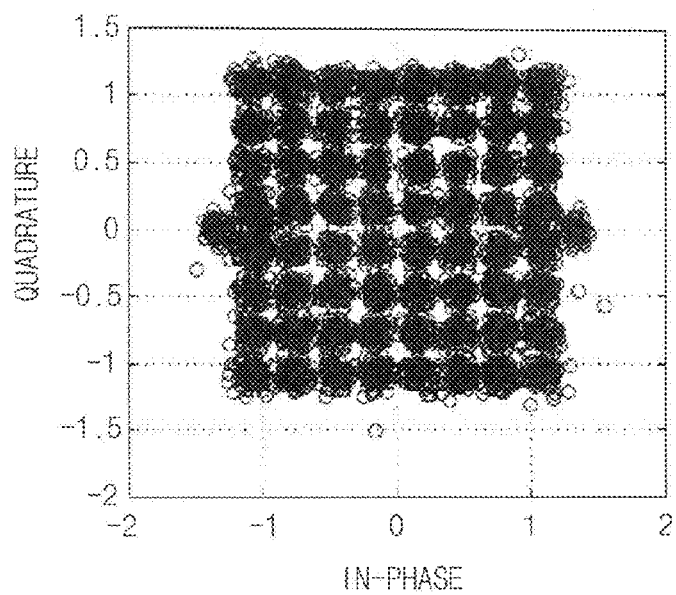

In other words, the reception unit 10 does not miss the pre-echo signal of 0 dB, and the normal results can be obtained as illustrated in FIGS. 10A and 10B.

FIGS. 10A and 10B are diagrams illustrating an IFFT output and a constellation in the first channel profile case.

Since the reception unit 10 detects the proper symbol start position as illustrated in FIG. 9B, the CIR result of FIG. 10A corresponding to the original channel profile may be obtained. The constellation of FIG. 10B is obtained after performing equalization using the channel estimation from the IFFT output of FIG. 10A, which shows the received data can be normally decoded.

As described above, the symbol timing synchronization unit 20 detects the positions of the two power peaks of FIG. 10A, and provides channel state informations corresponding to the position of the two power peaks.

Based on the first assumption that the coarse symbol timing performed by the reception unit 10 is wrong, the first channel state information corresponding to the second peak position is measured. In other words, the symbol timing is compensated so that the symbol start position may be changed to the second peak position, and then the channel state information is measured. In this case, the measured variance V1 is 0.050515, and the corresponding SIR1 is 2.65 dB.

On the other hand, based on the second assumption that the coarse symbol timing performed by the reception unit 10 is right, the second channel state information corresponding to the first peak position is measured. In other words, the symbol timing is fixed to the first peak position, and then the channel state information is measured. In this case, the measured variance V2 is 0.0056523, and the corresponding SIR2 is 21.14 dB.

Since SIR2 is greater than SIR1, that is, V2 is smaller than V1, the control unit 300 accepts the results based on the second assumption that the coarse symbol timing performed by the reception unit 10 is right, and maintains the symbol start position corresponding to the first peak position.

Cases of the single path (e.g., AWGN) may be categorized as Case I, but the symbol timing correction with respect to the single path is performed through another route, for example, by the control unit 300.

Figure 11A:
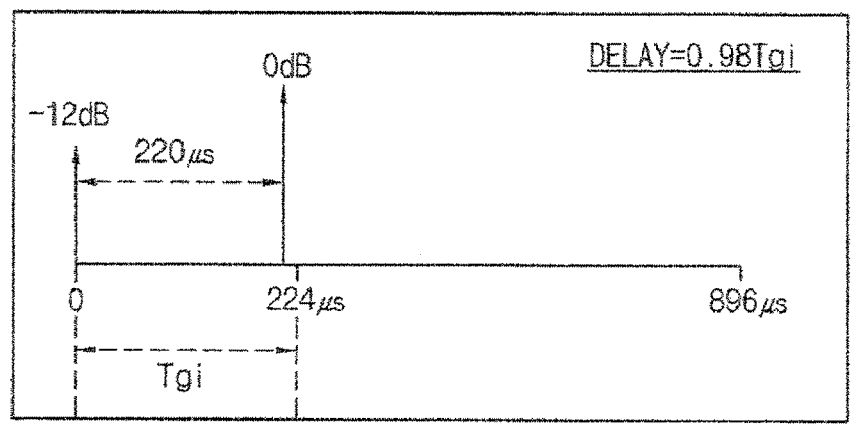
FIGS. 11A and 11B are diagrams illustrating a second channel profile case and a correlation peak thereof.
Figure 11B:
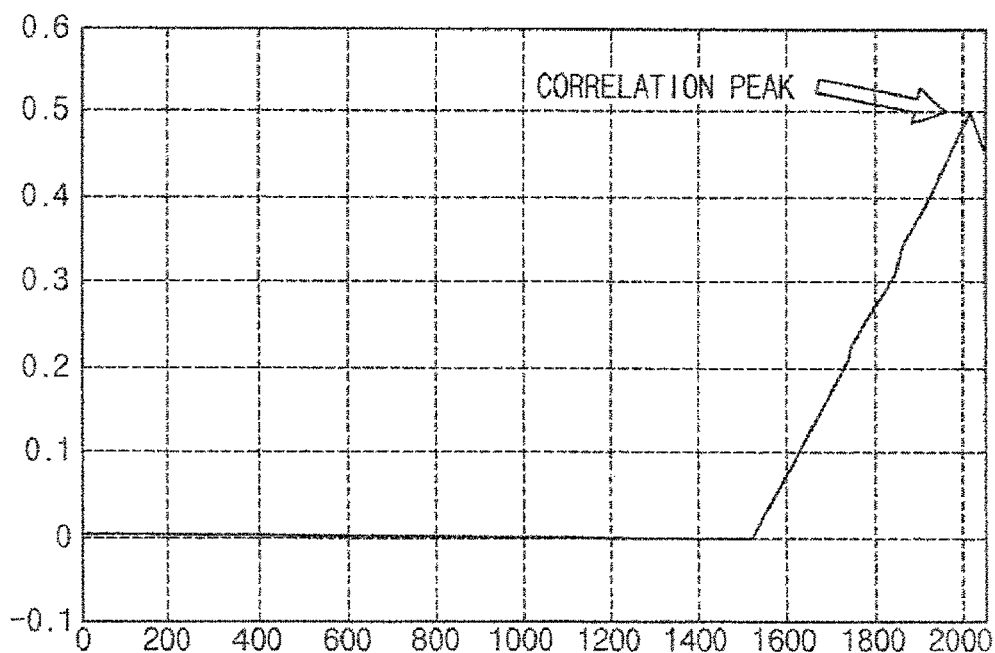

FIGS. 11A and 11B are diagrams illustrating a second channel profile case and a correlation peak thereof.

FIG. 11A illustrates a channel profile of Case II where the power of the pre-echo signal is weaker by −12 dB than the power of the post-echo signal, and FIG. 11B illustrates correlation result performed by the correlator in the reception unit 10 under the channel profile of Case II.

In this case, the correlator in the reception unit 10 does not detect the pre-echo signal of −12 dB, and detects only the post-echo signal of 0 dB. Accordingly the correlator determines the coarse symbol start position based on the position of the post-echo signal. That is, the reception unit 10 misses the pre-echo signal of −12 dB and thus the abnormal results are obtained as illustrated in FIGS. 12A and 12B.

Figure 12A:
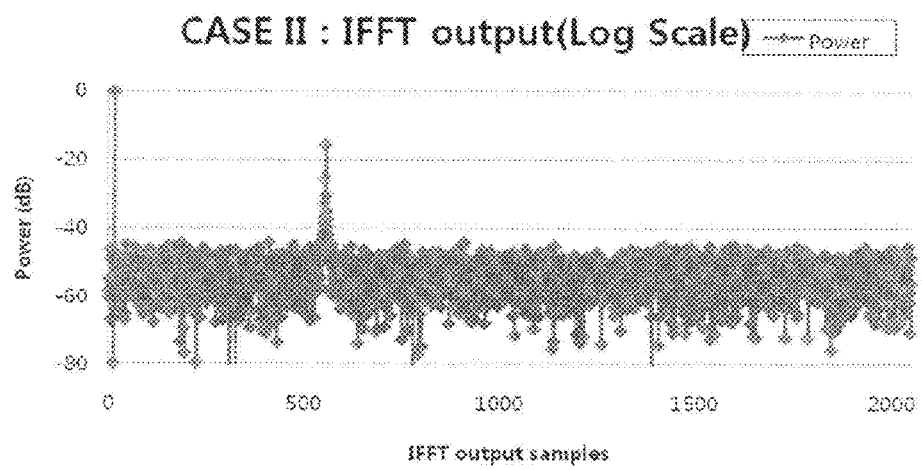
FIGS. 12A and 12B are diagrams illustrating an IFFT output and a constellation in the second channel profile case.
Figure 12B:
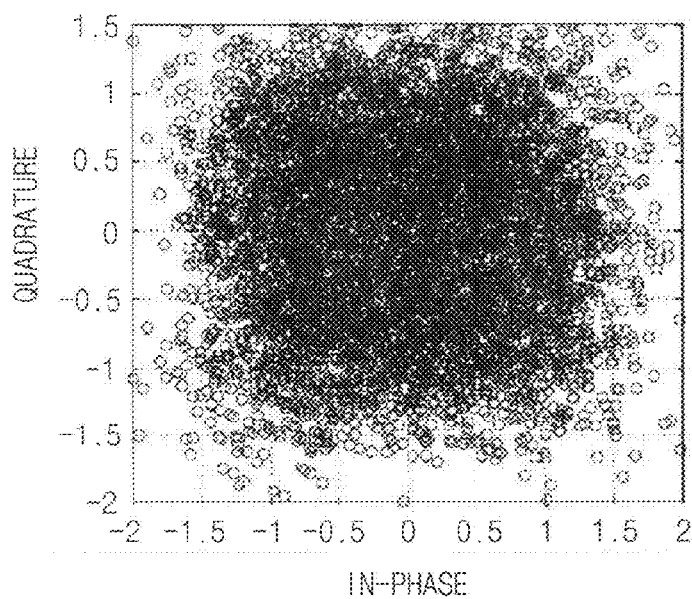

FIGS. 12A and 12B are diagrams illustrating an IFFT output and a constellation in the second channel profile case.

Since the reception unit 10 detects the improper symbol start position as illustrated in FIG. 11B, the CIR result of FIG. 12A is different from the original channel profile. The constellation of FIG. 12B is obtained after performing equalization using the channel estimation from the IFFT output of FIG. 12A, which shows serious degradation of performance such that 64-QAM itself can not be identified.

The reception unit 10 can not detect whether the symbol start position is wrong since the current channel profile is unknown. In contrast, the symbol timing synchronization unit 20 detects the positions of the two power peaks of FIG. 12A, and provides channel state informations corresponding to the position of the two power peaks. The symbol timing synchronization unit 20 verifies validity of the symbol start position using the provided channel state informations.

Based on the first assumption that the coarse symbol timing performed by the reception unit 10 is wrong, the first channel state information corresponding to the first peak position is measured. In other words, the symbol timing is compensated so that the symbol start position may be changed to the first peak position, and then the channel state information is measured. In this case, the measured variance V1 is 0.0062755, and the corresponding SIR1 is 21.72 dB.

On the other hand, based on the second assumption that the coarse symbol timing performed by the reception unit 10 is right, the second channel state information corresponding to the second peak position is measured. In other words, the symbol timing is fixed to the second peak position, and then the channel state information is measured. In this case, the measured variance V2 is 0.041092, and the corresponding SIR1 is 13.65 dB.

Since SIR2 is smaller than SIR1, that is, V2 is greater than VI, the control unit 300 accepts the results based on the first assumption that the coarse symbol timing performed by the reception unit 10 is wrong, and changes the symbol start position to the first peak position.

Figure 13A:
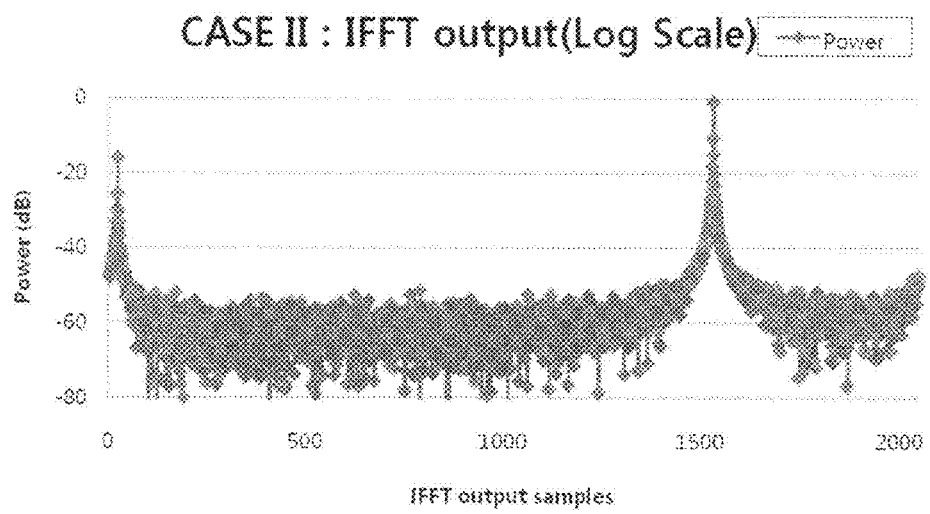
FIGS. 13A and 13B are diagrams illustrating an IFFT output and a constellation in the second channel profile case after a symbol start position is finally determined.
Figure 13B:
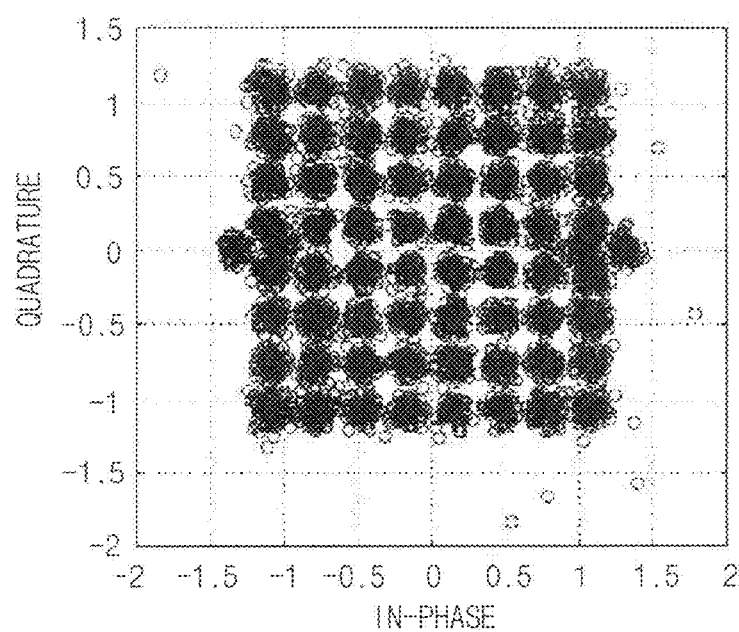

FIGS. 13A and 13B are diagrams illustrating an IFFT output and a constellation in the second channel profile case after a symbol start position is finally determined.

Referring to FIG. 13A, after changing the symbol start position based on the first assumption that the coarse symbol timing performed by the reception unit 10 is wrong, the pre-echo signal of −12 dB and the post-echo signal of 0 dB are analyzed and the path delay of 220 μs is calculated, as the original channel profile of Case II.

The constellation of FIG. 13B is obtained after performing equalization using the channel estimation from the IFFT output of FIG. 13A, which shows that channel estimation and compensation has been performed normally such that 64-QAM can be identified apparently.

The pre-echo cases among outside GI echo cases may be categorized as Case II, but the symbol timing correction with respect to the outside GI echo case is performed, for example, by the control unit 300, differently from the inside GI echo case.

Figure 14A:
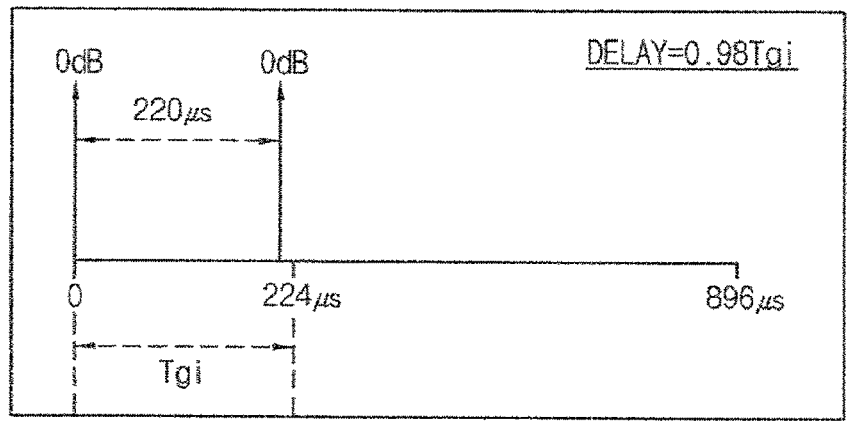
FIGS. 14A and 14B are diagrams illustrating a third channel profile case and a correlation peak thereof.
Figure 14B:
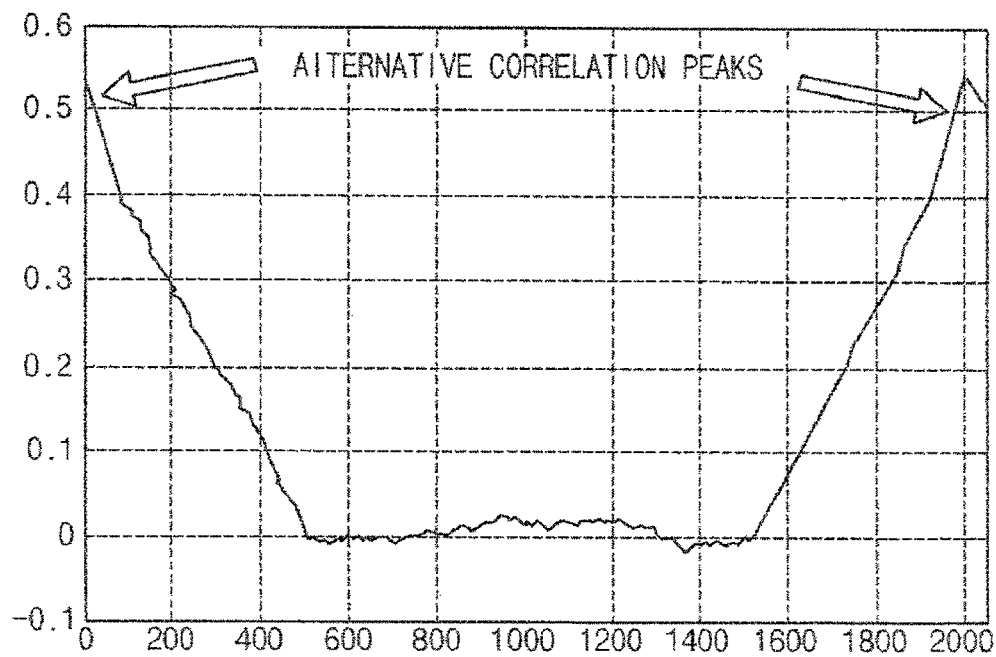

FIGS. 14A and 14B are diagrams illustrating a third channel profile case and a correlation peak thereof.

FIG. 14A illustrates a channel profile of Case III where the powers of the pre-echo signal and the post-echo signal are substantially identical to each other, and FIG. 14B illustrates correlation result performed by the correlator in the reception unit 10 under the channel profile of Case III.

As illustrated in FIG. 14A, the correlation peaks are formed at both ends. In this case, the reception unit 10 may determine the symbol start position based on the first correlation peak or the second correlation peak, or determine the center position of the two correlation peaks as the symbol start position. As such, the exact symbol start position can not be identified, and thus the conventional communication may be unstable.

Figure 15A:
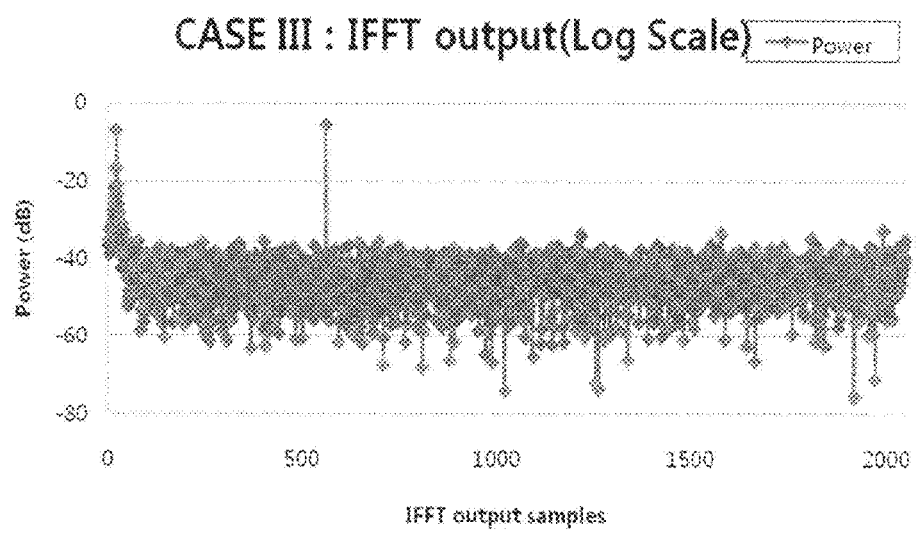
FIGS. 15A and 15B are diagrams illustrating an IFFT output and a constellation in the third channel profile case.
Figure 15B:
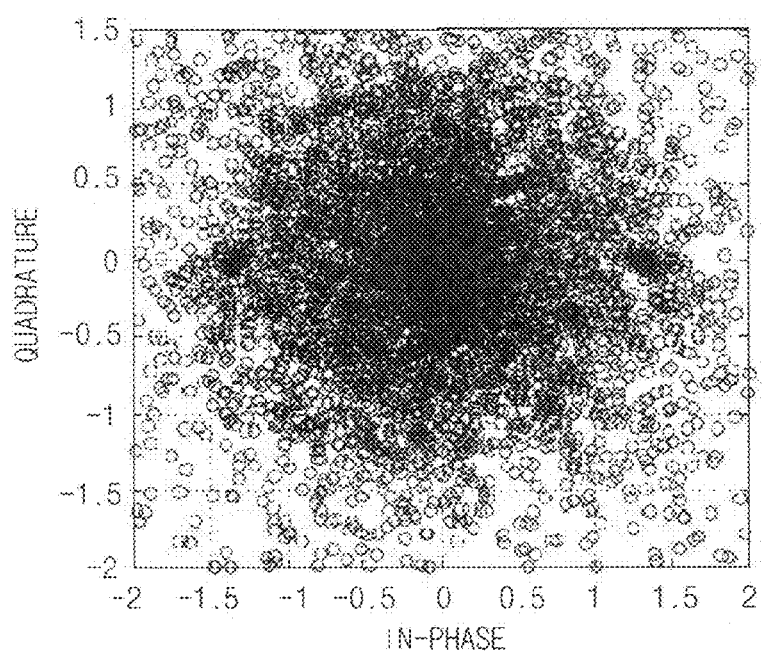

FIGS. 15A and 15B are diagrams illustrating an IFFT output and a constellation in the third channel profile case.

FIGS. 15A and 15B illustrates the results when the symbol start position is determined based on the second correlation peak of FIG. 14B. Since the reception unit 10 detects the improper symbol start position, the CIR result of FIG. 15A is different from the original channel profile. The constellation of FIG. 15B is obtained after performing equalization using the channel estimation from the IFFT output of FIG. 15A, which shows serious degradation of performance such that 64-QAM itself can not be identified. The degradation of performance in Case III is more serious than the degradation in Case II.

The reception unit 10 can not detect whether the symbol start position is wrong since the current channel profile is unknown. In contrast, the symbol timing synchronization unit 20 detects the positions of the two power peaks of FIG. 14A, and provides channel state informations corresponding to the position of the two power peaks. The symbol timing synchronization unit 20 verifies validity of the symbol start position using the provided channel state informations.

Based on the first assumption that the coarse symbol timing performed by the reception unit 10 is wrong, the first channel state information corresponding to the first peak position is measured. In other words, the symbol timing is compensated so that the symbol start position may be changed to the first peak position, and then the channel state information is measured. In this case, the measured variance V1 is 0.24213, and the corresponding SIR1 is 5.67 dB.

On the other hand, based on the second assumption that the coarse symbol timing performed by the reception unit 10 is right, the second channel state information corresponding to the second peak position is measured. In other words, the symbol timing is fixed to the second peak position, and then the channel state information is measured. In this case, the measured variance V2 is 20.674, and the corresponding SIR1 is −13.67 dB.

Since SIR2 is smaller than SIR1, that is, V2 is greater than VI, the control unit 300 accepts the results based on the first assumption that the coarse symbol timing performed by the reception unit 10 is wrong, and changes the symbol start position to the first peak position.

Figure 16A:
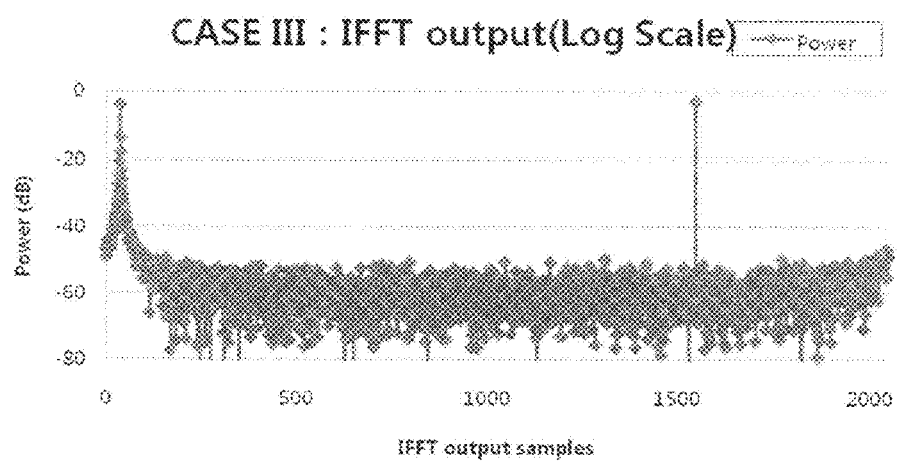
FIGS. 16A and 16B are diagrams illustrating an IFFT output and a constellation in the third channel profile case after a symbol start position is finally determined.
Figure 16B:
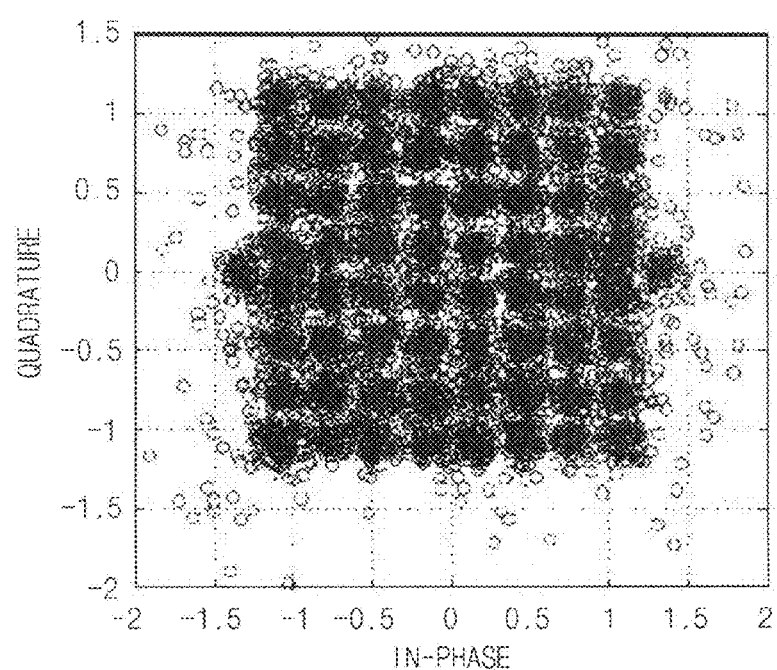

FIGS. 16A and 16B are diagrams illustrating an IFFT output and a constellation in the third channel profile case after a symbol start position is finally determined.

Referring to FIG. 16A, after changing the symbol start position based on the first assumption that the coarse symbol timing performed by the reception unit 10 is wrong, the pre-echo signal and the post-echo signal having substantially the same power of 0 dB are analyzed and the path delay of 220 μs is calculated, as the original channel profile of Case III.

The constellation of FIG. 16B is obtained after performing equalization using the channel estimation from the IFFT output of FIG. 16A, which shows that channel estimation and compensation has been performed normally such that 64-QAM can be identified apparently.

Figure 17:
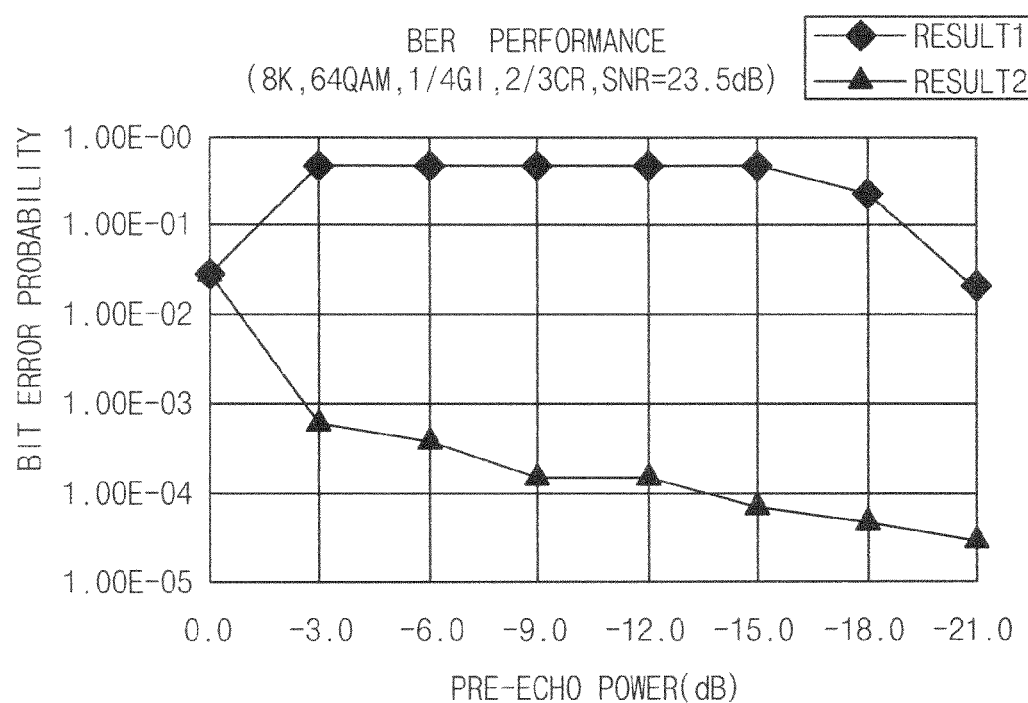
FIG. 17 is a diagram illustrating reduced Bit Error Rate (BER) in an OFDM communication system according to an exemplary embodiment.

FIG. 17 is a diagram illustrating reduced Bit Error Rate (BER) in an OFDM communication system according to an exemplary embodiment.

In FIG. 17, RESULT1 indicates Bit Error Rate (BER) of the conventional communication system and RESULT2 indicates BER of the communication system according to exemplary embodiments. With respect to FIG. 17, the FFT mode is 8K mode, the modulation type is 64-QAM, GI is 224 μs, the channel delay is set to 220 μs, that is, 98% of GI for assuming the worst case of the multi-path channel, and SNR is set to 23.5 dB.

As illustrated in FIG. 17, the communication system including the symbol timing synchronization device according to an exemplary embodiment shows enhanced performance compared with the conventional communication system only based on the correlation analysis. When the pre-echo power is 0 dB with respect to the post-echo power, two correlation peaks are detected as described above, and BERs of RESULT1 and RESULT1 may be the same if the first correlation peak is selected for the coarse symbol timing in the conventional communication system. However, when the pre-echo power is −3 through −15 dB with respect to the post-echo power, the performance of the conventional communication system is degraded since the pre-echo signal is missed but the performance of the communication according to exemplary embodiments is enhanced since influences of multi-path is reduced as the pre-echo power is decreased. When the pre-echo power is −18 through −21 dB with respect to the post-echo power, the performance of the conventional communication system is a little improved since the relative ISI is reduced due to the considerably weak pre-echo power but the performance of the communication system according to exemplary embodiments is considerably enhanced up to the result of no ISI. As such, the communication system according to exemplary embodiments shows the enhanced performance for various cases of −3 dB through −21 dB under the channel circumstances having SNR of 23.5 dB. Furthermore, the communication system according to exemplary embodiments shows the enhanced performance even in case of the path-delay corresponding to almost full GI length.

In an OFDM system such as DVB-T/H using multi-carriers, symbol timing synchronization may be classified into time-domain processing types using GI/CP and frequency domain processing types using pilot symbols. The conventional time-domain processing may be conveniently implemented and reduce synchronization time in AWGN channel and a Rayleigh channel. However, precise symbol timing offset can not be secured in SFN channel, and ISI can not be prevented when the power of the first arrived signal is weak under −10 dB with respect to the power of the main signal. The conventional frequency-domain processing uses SNR-dependent threshold for securing ISI-free sampling region, but it is difficult to obtain the precise threshold according to the current channel state. Also the precise channel profile estimation is impossible when the power of the first arrived signal is weak about −18 through −21 dB with respect to the power of the main signal.

The symbol synchronization method according to exemplary embodiments may estimate and detect the pre-echo signal of −10 through −21 dB power, and thus may efficiently prevent the symbol timing errors due to ISI.

As described above, methods and devices of synchronizing symbol timing and communication system according to exemplary embodiments may perform efficient symbol timing synchronization by determining a proper symbol start position through CIR feedback and SIR comparison.

Particularly, ISI due to high delay spread in the SFN channel in coherent OFDM communication system may be reduced even in case of the weak pre-echo signal of −21 dB. The present inventive concept may be used to perform efficient symbol timing synchronization in arbitrary communication systems based on symbols, particularly in systems based on OFDM symbols such as DMB systems, DVB-T systems, DVB-H systems, etc.

Although practical exemplary embodiments have been described, those skilled in the art will readily appreciate that many modifications are possible. Therefore, it is to be understood that the foregoing is not to be construed as limited to the specific exemplary embodiments disclosed, and that modifications to the disclosed exemplary embodiments, as well as other exemplary embodiments, are also intended to be included within the scope of the appended claims.

What is claimed is:

1. A method of synchronizing symbol timing in a communication system, the method comprising: generating time-domain signals by performing an inverse fast Fourier transform (IFFT) on frequency-domain signals; detecting positions of power peaks by analyzing a channel impulse response (CIR) of the time-domain signals; providing channel state informations by analyzing a channel state, each channel state information corresponding to each position of the power peaks; and determining a symbol start position based on the channel state informations; wherein detecting the positions of the power peaks includes: abstracting a main peak power corresponding to a maximum power of the time-domain signals; scaling threshold values based on the main peak power, the threshold values being for rejecting noise peaks; and estimating the power peaks based on the scaled threshold values.

2. The method of claim 1, wherein detecting the positions of the power peaks includes:
   estimating the power peaks based on threshold values for rejecting noise peaks.

3. The method of claim 1, wherein providing the channel state informations includes:
   calculating timing offsets and path delays based on the positions of the power peaks;
   compensating a current symbol timing of the communication device based on the timing offsets and the path delays, respectively; and
   measuring the channel state informations based on the respectively compensated symbol timing.

4. The method of claim 1, wherein providing the channel state informations includes:
   calculating variances of powers of sub-carriers, each variance corresponding to each channel state information.

5. The method of claim 4, wherein the variances includes inter-carrier interference (ICI) noises and inter-symbol interference (ISI) noises.

6. The method of claim 4, wherein determining the symbol start position includes:
   comparing the variances to determine the peak power corresponding to a minimum variance; and
   determining the symbol start position based on a timing offset of the power peak corresponding to the minimum variance.

7. The method of claim 1, further comprising:
   determining, based on the positions of the power peaks, whether multi-path interference exists.

8. The method of claim 1, further comprising:
   determining, based on the positions of the power peaks, whether a delay time due to multi-path delay is out of a guard interval of a symbol.

9. A symbol timing synchronization device in a communication system, the symbol timing synchronization device comprising:
   an inverse fast fourier transform (IFFT) unit configured to convert frequency-domain signals into time-domain signals; a channel impulse response (CIR) analyzer configured to detect positions of power peaks by analyzing a CIR of the time-domain signals; a channel state analyzer configured to provide channel state informations by analyzing a channel state, each channel state information corresponding to each position of the power peaks; and a control unit configured to control the IFFT unit, the CIR analyzer and the channel state analyzer, and configured to determine a symbol start position based on the channel state informations; the CIR analyzer includes:
   a peak power estimator configured to sequentially receive the time-domain signals to generate peak on signals based on powers of the time-domain signals; a peak position detector configured to generate peak position signals based on threshold values and the peak on signals, the threshold values being for rejecting noise peaks; and an offset-delay estimator configured to calculate timing offsets and path delays based on the peak position signals.

10. The symbol timing synchronization device of claim 9, further comprising:
a storage unit configured to store values of the time-domain signals from the IFFT unit.

11. The symbol timing synchronization device of claim 9, further comprising:
an address generator configured to generate an address signal for identifying each of the sequentially received time-domain signals,
wherein the peak position detector generates peak position signals based on the address signal when the peak on signals are activated.

12. The symbol timing synchronization device of claim 9, wherein the CIR analyzer further includes:
a main peak power abstractor configured to abstract a main peak power corresponding to a maximum power of the time-domain signals.

13. The symbol timing synchronization device of claim 12, wherein the peak power estimator is configured to scale threshold values based on the main peak power, the threshold values being for rejecting noise peaks, to generate the peak on signals based on the scaled threshold values.

14. The symbol timing synchronization device of claim 9, wherein the peak position detector is configured to determine, based on the positions of the power peaks, whether multi-path interference exists and whether a delay time due to multi-path delay is out of a guard interval of a symbol.

15. The symbol timing synchronization device of claim 9, further comprising:
a channel state comparator configured to compare the channel state informations to generate a comparison signal indicating the power peak that corresponds to a best channel state,
wherein the control unit determines the symbol start position based on the comparison signal.

16. A communication system based on an orthogonal frequency division multiplexing (OFDM) signal, the communication system comprising:
a reception unit configured to receive the OFDM signal and configured to generate frequency-domain signals by processing the received OFDM signal; an inverse fast fourier transform (IFFT) unit configured to convert the frequency-domain signals into time-domain signals; a channel impulse response (CIR) analyzer configured to detect positions of power peaks by analyzing a CIR of the time-domain signals; a channel state analyzer configured to provide channel state informations by analyzing a channel state, each channel state information corresponding to each position of the power peaks; and
a control unit configured to control the IFFT unit, the CIR analyzer and the channel state analyzer, and configured to determine a symbol start position of the OFDM signal based on the channel state informations; the CIR analyzer includes: a peak power estimator configured to sequentially receive the time-domain signals to generate peak on signals based on powers of the time-domain signals; a peak position detector configured to generate peak position signals based on threshold values and the peak on signals, the threshold values being for rejecting noise peaks; and an offset-delay estimator configured to calculate timing offsets and path delays based on the peak position signals.

17. The communication system of claim 16, wherein the reception unit includes:
a demodulator configured to demodulate the received OFDM signal to generate a demodulated signal and configured to provide coarse sampling timing by abstracting a correlation peak of the demodulated signal;
a guard interval (GI) remover configured to remove the GI in the demodulated signal; and
a fast fourier transform (FFT) unit configured to convert an output of the GI remover into the frequency-domain signals.

18. The communication system of claim 17, wherein the GI remover is configured to change the coarse sampling timing based on the symbol start position that is determined by the control unit.

* * * * *